(12) United States Patent
Li et al.

(10) Patent No.: US 9,679,363 B1
(45) Date of Patent: Jun. 13, 2017

(54) SYSTEM AND METHOD FOR REDUCING IMAGE NOISE

(71) Applicant: Marvell International Ltd., Hamilton (BM)

(72) Inventors: Hongxin Li, Shanghai (CN); Jun Liu, Nanjing (CN)

(73) Assignee: Marvel International Ltd., Hamilton (BM)

(*) Notice: Subject to any disclaimer, the term of this patent is extended or adjusted under 35 U.S.C. 154(b) by 0 days.

(21) Appl. No.: 14/956,884

(22) Filed: Dec. 2, 2015

Related U.S. Application Data

(60) Provisional application No. 62/091,882, filed on Dec. 15, 2014.

(51) Int. Cl.
| | |
|---|---|
| *G06K 9/00* | (2006.01) |
| *G06K 9/40* | (2006.01) |
| *G06T 5/00* | (2006.01) |
| *G06T 5/20* | (2006.01) |
| *G06K 9/46* | (2006.01) |
| *G06K 9/62* | (2006.01) |

(52) U.S. Cl.
CPC ............ *G06T 5/002* (2013.01); *G06K 9/4642* (2013.01); *G06K 9/6202* (2013.01); *G06K 9/6215* (2013.01); *G06T 5/20* (2013.01); *G06T 2207/10024* (2013.01); *G06T 2207/20028* (2013.01); *G06T 2207/20182* (2013.01)

(58) Field of Classification Search
CPC G06T 5/002; G06T 7/408; G06T 5/20; G06T 2207/10024; G06T 2207/20028; G06T 5/50; G06T 2207/20021; G06T 2207/20182; G06K 9/6211; G06K 9/4652; G06K 9/56; G06K 9/6202; H04N 9/045; H04N 9/646; H04N 1/409
USPC .................................................. 382/167, 274
See application file for complete search history.

(56) References Cited

U.S. PATENT DOCUMENTS

| | | | | |
|---|---|---|---|---|
| 8,149,336 B2* | 4/2012 | Mohanty | ................... | G06T 5/50 |
| | | | | 348/607 |
| 8,768,093 B2* | 7/2014 | Yoo | ......................... | G06T 5/002 |
| | | | | 382/264 |
| 8,811,740 B1* | 8/2014 | Brendel | .................. | G06T 5/007 |
| | | | | 382/167 |
| 2011/0274350 A1* | 11/2011 | Hara | ........................ | G06T 5/20 |
| | | | | 382/167 |
| 2011/0317916 A1* | 12/2011 | Zhang | ................... | G06T 3/4015 |
| | | | | 382/167 |
| 2012/0237124 A1* | 9/2012 | Bosco | ....................... | G06T 5/20 |
| | | | | 382/167 |

\* cited by examiner

*Primary Examiner* — Kanjibhai Patel

(57) ABSTRACT

System and methods are provided for performing image noise reduction. Color estimation of a pixel in an image is performed, wherein the image is stored in a data structure in a non-transitory computer-readable storage medium and the pixel has an initial pixel value. A pixel-block size is selected for pixel block similarity calculations based at least in part on the color estimation. One or more first pixel blocks associated with the pixel of the selected pixel-block size are determined. One or more first pixel block average values for the one or more first pixel blocks are calculated. A weighted average of the first pixel block average values is calculated. The data structure is updated by replacing the initial pixel value of the pixel with the weighted average of the first pixel black average values.

19 Claims, 7 Drawing Sheets

SYSTEM AND METHOD FOR REDUCING IMAGE NOISE

CROSS-REFERENCE TO RELATED APPLICATIONS

This disclosure claims priority to and benefit from U.S. Provisional Patent Application No. 62/091,882, filed on Dec. 15, 2014, the entirety of which is incorporated herein by reference.

FIELD

The technology described in this patent document relates generally to image processing and more particularly to noise reduction for image data.

BACKGROUND

Noise reduction is important for image processing. Different sources of noise in digital images may be acquired by image sensors in digital cameras, camcorders, and scanners. Noise characteristics in an image may be affected by many factors, such as sensor type, pixel dimensions, temperature, exposure time, etc. Noise often includes fluctuations in color and luminance. Various algorithms have been developed for noise reduction in image processing, such as multi-scale bilateral denoising (MSBD) filtering, block matching three dimensional (BM3D) filtering, large scale bilateral filtering, etc.

SUMMARY

In accordance with the teachings described herein, system and methods are provided for performing image noise reduction. Color estimation of a pixel in an image is performed, wherein the image is stored in a data structure in a non-transitory computer-readable storage medium and the pixel has an initial pixel value. A pixel-block size is selected for pixel block similarity calculations based at least in part on the color estimation. One or more first pixel blocks associated with the pixel of the selected pixel-block size are determined. One or more first pixel block average values for the one or more first pixel blocks are calculated. A weighted average of the first pixel block average values is calculated. The data structure is updated by replacing the initial pixel value of the pixel with the weighted average of the first pixel block average values.

In one embodiment, a system for performing image noise reduction comprises: one or more non-transitory computer-readable storage media operable to store a data structure for an image, and one or more processors. The one or more processors are operable to: perform color estimation of a pixel in an image, the pixel having an initial pixel value; select a pixel-block size for pixel block similarity calculations based at least in part on the color estimation; determine one or more first pixel blocks of the selected pixel-block size, the one or more first pixel blocks being associated with the pixel; calculate one or more first pixel block average values for the one or more first pixel blocks; calculate a weighted average of the first pixel block average values; and update the data structure by replacing the initial pixel value of the pixel with the weighted average of the first pixel block average values.

In another embodiment, a non-transitory machine-readable storage medium encoded with instructions is provided for commanding one or more processors to execute operations of a method for performing image noise reduction. Color estimation of a pixel in an image is performed, wherein the image is stored in a data structure in a non-transitory computer-readable storage medium and the pixel has an initial pixel value. A pixel-block size is selected for pixel block similarity calculations based at least in part on the color estimation. One or more first pixel blocks associated with the pixel of the selected pixel-block size are determined. One or more first pixel block average values for the one or more first pixel blocks are calculated. A weighted average of the first pixel block average values is calculated. The data structure is updated by replacing the initial pixel value of the pixel with the weighted average of the first pixel block average values.

DETAILED DESCRIPTION

Conventional noise reduction algorithms have some disadvantages. For example, MSBD performs noise reduction poorly on edges in a low-light image. Also, MSBD may consume a large number of line buffers in some circumstances. BM3D is usually too complicated for hardware implementation. The present disclosure describes systems and methods that are configured to implement multi-scale pixel block matching with local content adaptation for image noise reduction. As used herein, "block matching" refers to locating matching pixel blocks in an image.

Figure 1:
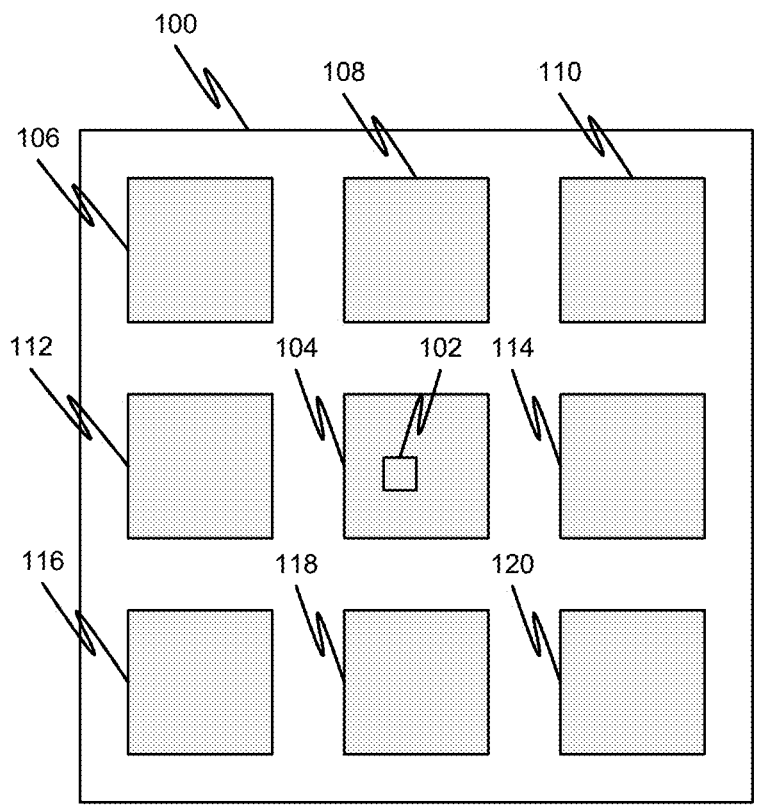
FIG. 1 depicts an example diagram showing pixel block matching for image noise reduction.

FIG. 1 depicts an example diagram showing pixel block matching for image noise reduction. As shown in FIG. 1, a pixel 102 in an image is selected for noise reduction. A proper pixel-block size is selected from multiple possible pixel-block sizes based on local content related to the pixel 102 of the image (e.g., textures, color). Noise reduction is performed based on block matching of multiple pixel blocks of the selected pixel-block size.

Specifically, each pixel block contains multiple rows and multiple columns of pixels. Multiple pixel-block sizes may be initially explored to select the proper pixel-block size. For example, if the image includes certain small textures (e.g., meadow grasses), then the proper pixel-block size cannot be too large. Otherwise, block matching may not be successful since it may not be easy to find similar pixel blocks for a current pixel block that includes the textures. As another example, if the image includes large flat regions, the proper pixel-block size can be selected as large as possible to better reduce noises.

In some embodiments, local color estimation of the pixel 102 is performed, and an estimated color value of the pixel 102 can be used to determine one or more thresholds that are related to region classification. Particularly, for each possible pixel-block size, a number of pixel blocks are determined and pixel block similarities are calculated and compared with the thresholds. For example, when the pixel block similarities for a particular pixel-block size are larger than the thresholds, that pixel-block size is a candidate for block matching. If there are more than one pixel-block size that can be candidates for block matching, the largest of these pixel-block sizes can be selected as the proper pixel-block size.

Once the proper pixel-block size is selected, a number of pixel blocks of the selected pixel-block size are determined for block matching. For example, as shown in FIG. 1, the pixel blocks 104, 106, 108, 110, 112, 114, 116, 118 and 120 all have the selected pixel-block size. The pixel block similarity between the block 106 and the block 104 that includes the current pixel 102 is determined to be an aggregation of pixel similarity values between each pixel in the pixel block 104 and the corresponding pixel in the pixel block 106. Also, block similarities between the pixel block 104 and the pixel blocks 108, 110, 112, 114, 116, 118 and 120 can be calculated respectively.

A weight may be assigned to each pixel block in the block window 100 based on the calculated block similarities. Then, a weighted average of the pixel block average values of the pixel blocks is calculated based on the assigned weights, and the initial pixel value of the pixel 102 is replaced by the weighted average. For example, a pixel block average value for each pixel block can be determined by averaging all pixel values within the particular pixel block. After the noise reduction of the current pixel is completed, a pixel near the current pixel is selected for noise reduction, and a similar process is carried out for the newly selected pixel.

In some embodiments, a pixel block similarity parameter between two pixel blocks can be determined as follows:

$$S_{block,k}(B_{k,x1,y1}, B_{k,x2,y2}) \equiv \sum_{i,j} S_{pixel}(p1_{i,j}, p2_{i,j}), \quad (1)$$

$$p1 \in B_{k,x1,y1}, p2 \in B_{k,x2,y2}$$

wherein $S_{block,k}(B_{k,x1,y1}, B_{k,x2,y2})$ represents the pixel block similarity parameter between a block $B_{k, x1, y1}$ that has a size of k×k and is centered at a pixel (x1, y1) and another block $B_{k, x2, y2}$ that has a size of k×k and is centered at a pixel (x2, y2), and $S_{pixel}(p1_{i,j}, p2_{i,j})$ represents a pixel similarity parameter between two pixels p1 and p2.

The pixel similarity parameter between the pixels p1 and p2 can be determined as follows:

$$S_{pixel}(p1, p2) \equiv \log\left(Pr\left\{\mu_1 - \mu_2 < JND\left(\frac{\mu_1 + \mu_2}{2}\right) \middle| p1, p2\right\}\right), \quad (2)$$

$$P1 \sim N(\mu_1, \sigma_1^2), P2 \sim N(\mu_2, \sigma_2^2)$$

wherein $S_{pixel}(p1, p2)$ represents the pixel similarity parameter between the pixels p1 and p2, $\mu_1$ represents a pixel value of the pixel p1, $\mu_2$ represents a pixel value of the pixel p2, $\sigma_1$ represents a standard deviation associated with the pixel p1, and $\sigma_2$ represents a standard deviation associated with the pixel p2, Pr represents a probability, JND represents a just-noticeable-difference parameter, and N indicates a Gaussian probability distribution. For example, excluding local content information (e.g., texture, color), the JND is proportional to a local pixel level.

Figure 2:
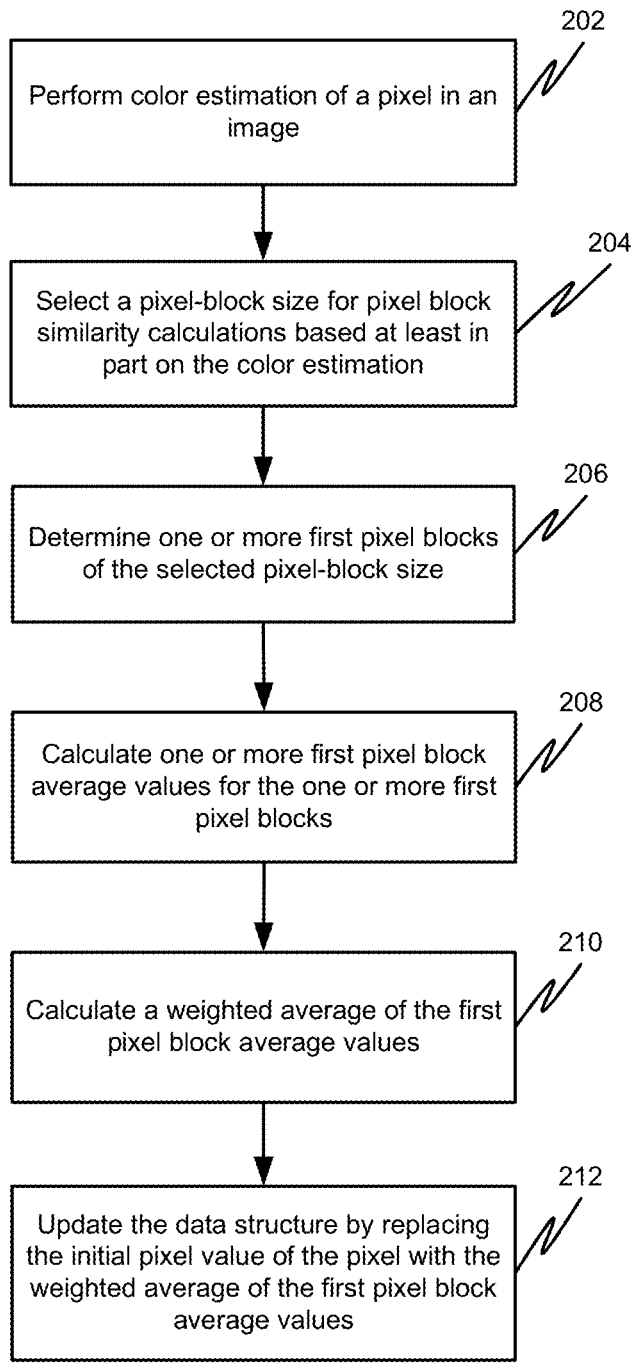
FIG. 2 depicts an example flow chart for image noise reduction.

FIG. 2 depicts an example flow chart for image noise reduction. The operations of the flow chart illustrated in FIG. 2 can be performed by a computing system according to one embodiment. The operations of the flow chart illustrated in FIG. 2 can be implemented in software, firmware, hardware, or any combination thereof. At 202, a computing system (e.g., an image noise reduction module of the computing system) performs color estimation of a pixel in an image, where the image is stored in a data structure in a non-transitory computer-readable storage medium and the pixel has an initial pixel value.

For example, local color estimation of the current pixel (e.g., the pixel 102) may be performed, e.g., using a large scale bilateral filtering algorithm. In some embodiments, a 16×16 pixel block window is determined and is centered on a pixel block that includes the current pixel. Bilateral filtering can be performed between the current pixel and pixel block average values of the pixel blocks within the 16×16 block window. For example, the pixel block average values are weighted based on spatial distances of the pixel blocks from the current pixel (e.g., domain filtering). In addition, the pixel block average values are weighted based on tonal differences (e.g., intensity, color, etc.) of the pixel blocks from the current pixel (e.g., range filtering). As an example, bilateral filtering can be performed in a linear Red-Green-Blue (RGB) color space. Similar range filter weighting is applied to the R, G, B components of the current pixel (e.g., as a vector). Specifically, the range filter weighting is performed based on similarity and noise models. The weighted average of the pixel block average values is used to determine a local color value of the current pixel. It should be noted that a pixel-block size of 16×16 is described herein for illustrative purposes, and not intended to be a limitation. The mechanisms for performing image noise reduction apply equally to other pixel-block sizes.

At 204, the computing system selects a pixel-block size for performing pixel block similarity calculations based at least in part on the color estimation. In some embodiments, the computing system searches a look-up table using the local color value of the current pixel, and determines one or more thresholds that correspond to the local color value of the current pixel in the look-up table. For example, a number of initial pixel-block sizes can be explored. The computing system performs similarity calculations according to the initial pixel-block sizes to determine one or more similarity parameters. Specifically, for each initial pixel-block size, several pixel blocks associated with the current pixel can be determined and the block similarities are calculated accordingly. As an example, a block similarity between two pixel blocks is determined as an aggregation of pixel similarity parameters between each pixel value in one pixel block and a corresponding pixel value in the other pixel block. The block similarities correspond to different pixel-block sizes are compared with the thresholds. For example, when the pixel block similarities for a particular pixel-block size are larger than the thresholds, that pixel-block size is a candidate for block matching. If there are more than one pixel-block size that can be candidates for block matching, the largest of these pixel-block sizes can be selected as the proper pixel-block size.

At 206, the computing system determines one or more pixel blocks having the selected pixel-block size. At 208, the computing system calculates one or more pixel block average values for the determined one or more pixel blocks. For example, the pixel block average value for each pixel block is equal to an average of all pixel values in the pixel block. At 210, the computing system calculates a weighted average of the pixel block average values. A weight may be assigned to each pixel block based on the calculated block similarities. Then, a weighted average of the pixel block average values of the pixel blocks is calculated based on the assigned weights. At 212, the computing system updates the data structure by replacing the initial pixel value of the current pixel with the weighted average of the pixel block average values. Similar processes can be carried out for noise reduction of a next pixel in the image.

Figure 3:
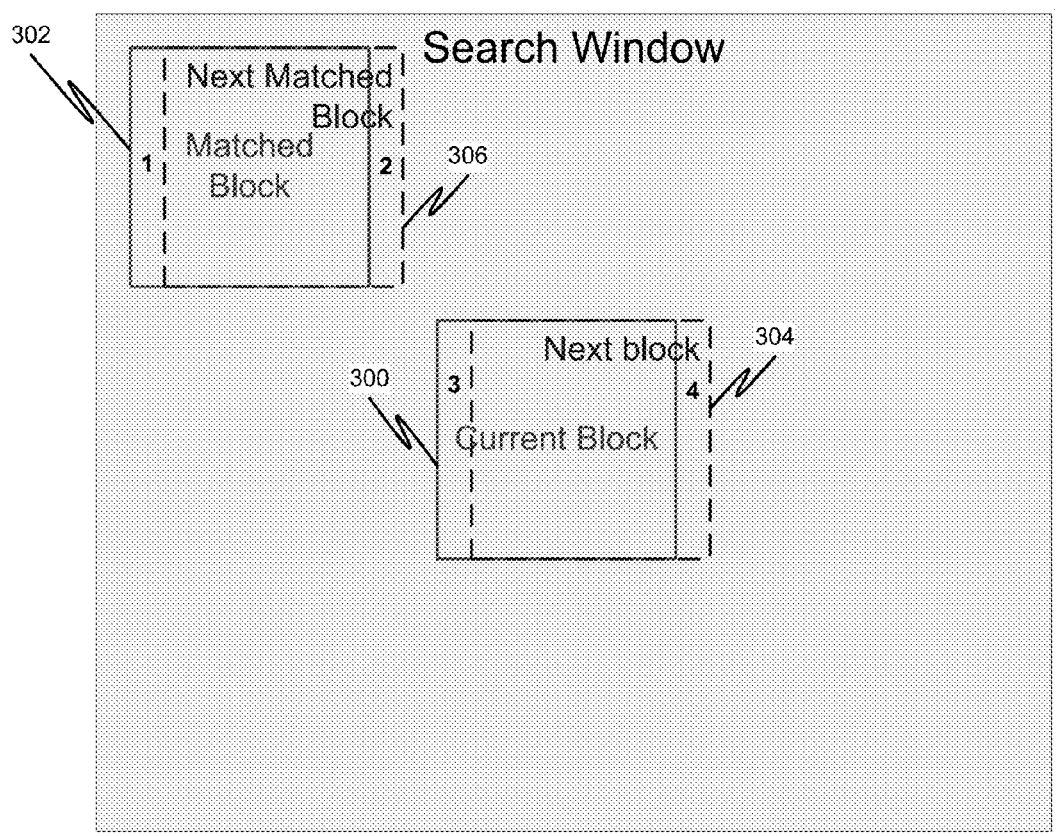
FIG. 3 depicts an example diagram showing fast block similarity calculation.

As described above, pixel block similarity is calculated by aggregating pixel similarities of all pixels in different pixel blocks. In some embodiments, pixel similarities of pixels in a same column may be aggregated to generate a column similarity value for storage so that pixel block similarity calculations can be performed faster. FIG. 3 depicts an example diagram showing fast block similarity calculation. As shown in FIG. 3, a current pixel block 300 includes a current pixel for noise reduction, wherein the current pixel block 300 corresponds to a matched pixel block 302, and a pixel block similarity can be determined (e.g., by aggregating column pixel similarities of corresponding columns in these two pixel blocks). Once the noise reduction of the current pixel is completed, a next pixel can be selected for noise reduction. Compared to the current pixel, the next pixel is in a same row but in a next column. Then, a new pixel block 304 that includes the next pixel is determined for block matching, and a pixel block 306 that matches the pixel block 304 is determined.

To calculate the block similarity between the pixel blocks 304 and 306, the previous block similarity value can be used for fast calculation. As shown in FIG. 3, compared to the previous pixel block 300, the pixel block 304 includes a new column 4 but does not include the column 3. Correspondingly, the matched pixel block 306 includes a new column 2 but not the column 1, compared to the previous matched block 302. Thus, the new block similarity value between the pixel blocks 304 and 306 can be determined by replacing the column similarity value between the column 1 and the column 3 with the column similarity value between the column 2 and the column 4. For example, the previous block similarity value between the pixel blocks 300 and 302 and the column similarity value between the column 1 and the column 3 can be read out from storage. The new block similarity value can be determined to be equal to a sum of the column similarity value between the column 2 and the column 4 and the previous block similarity value minus the column similarity value between the column 1 and the column 3.

Figure 4:
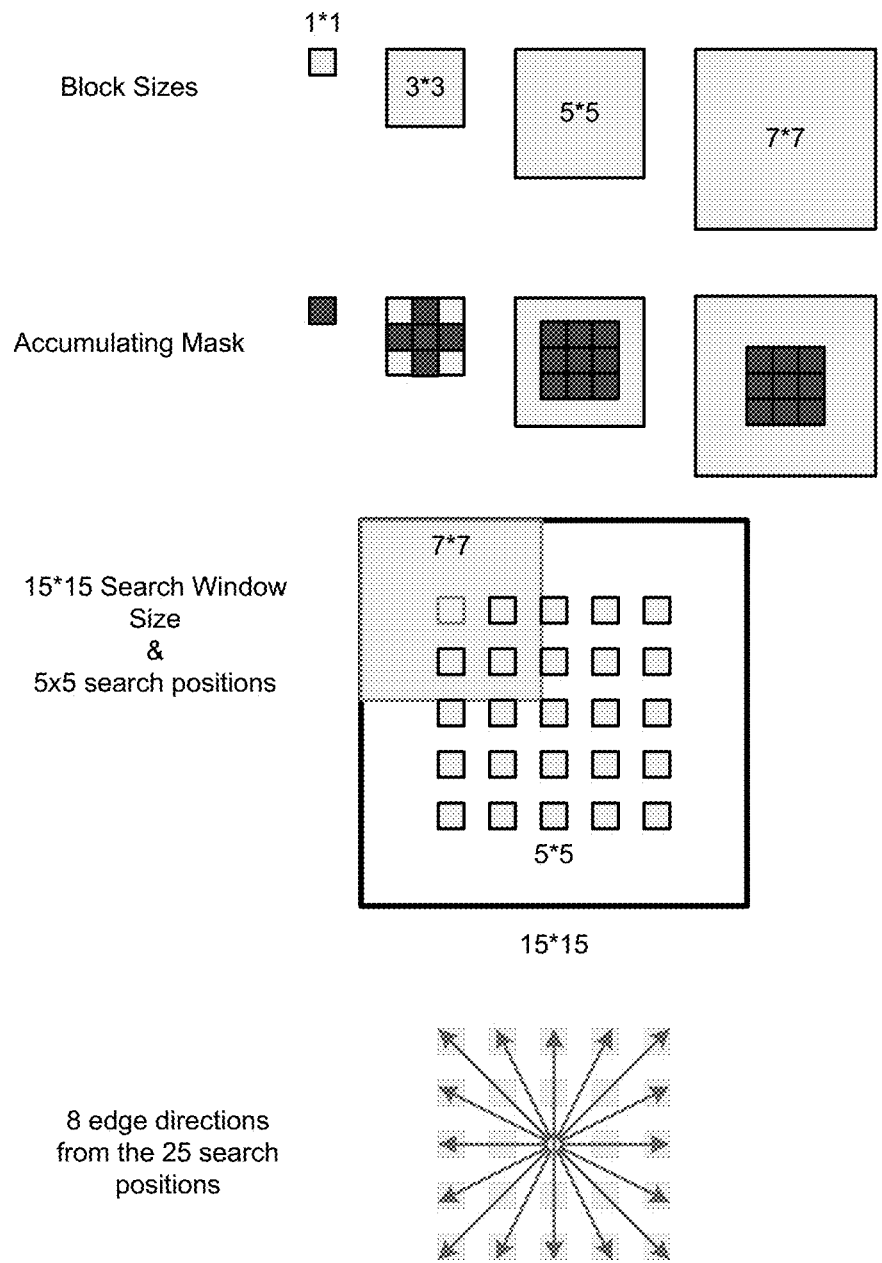
FIG. 4 depicts an example diagram showing multi-scale block matching with local content adaptation.

FIG. 4 depicts an example diagram showing multi-scale block matching with local content adaptation. As shown in FIG. 4, different pixel-block sizes are explored, and a proper pixel-block size is selected according to local content of a current pixel. Block matching can be performed based on the selected pixel-block size.

Specifically, local color estimation can be performed for a current pixel (e.g., the pixel 102). A look-up table is searched to determine one or more thresholds that correspond to the local color estimation. The thresholds can be used for selecting a proper pixel-block size. Initially, four pixel-block sizes, such as 1×1, 3×3, 5×5 and 7×7, can be explored for multi-scale block matching. Block similarities can be determined for each pixel-block size. An accumulating mask (e.g., representing one or more filtering or smoothing operations) can be determined for each pixel-block size and a proper pixel-block size is selected based on the corresponding block similarities and the thresholds. For example, the pixel-block size 7×7 is selected.

As shown in FIG. 4, in a 15×15 search window, a 7×7 pixel block that includes the current pixel is determined. One or more other pixel blocks (not shown) near the 7×7 pixel block may be determined for block matching. For example, these pixel blocks near the 7×7 pixel block are within the search window. The block similarities between these pixel blocks can be calculated, and weights are determined for these pixel blocks according to the accumulating mask. Then, a weighted average calculation is performed on pixel block average values of these pixel blocks, and the weighted average value is used to replace the initial pixel value of the current pixel. In certain embodiments, for the 15×15 search window, there are 5×5 search positions, and 8 edge directions from the 25 search positions. It should be understood that the mechanisms described herein are not limited to any pixel-block sizes, any block window dimensions or any block window symmetry. For example, initial pixel-block sizes 2×2, 4×4, 6×6 and 8×8 may be used for multi-scale block matching.

Figure 5:
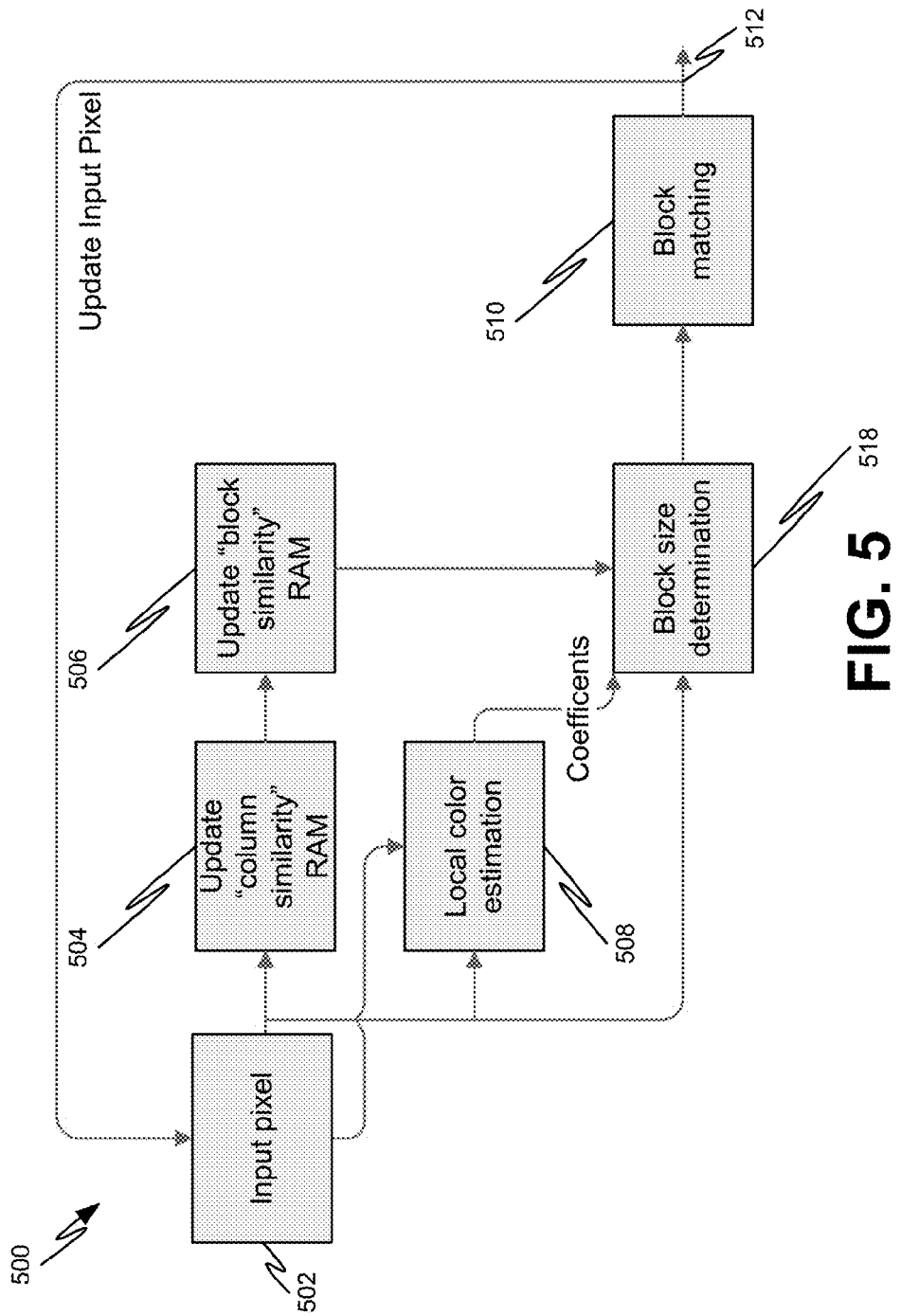
FIG. 5 depicts an example system for image noise reduction.

FIG. 5 depicts an example system for image noise reduction. As shown in FIG. 5, a local color estimation module 508 performs local color estimation for an input pixel 502, and provides one or more coefficients related to a local color value of the input pixel 502 to a pixel-block-size-determination module 518. Column similarity parameters 504 stored in a storage medium are updated in response to the input pixel 502, and in turn block similarity parameters 506 are updated. The pixel-block-size-determination module 518 dynamically selects a proper pixel-block size among available initial pixel-block sizes for block matching. A block matching module 510 performs block similarity calculations for a number of pixel blocks associated with the input pixel 502 and calculates a weighted average 512 of pixel block average values of these pixel blocks. The weighted average 512 is provided to update the input pixel value. For example, the system 500 implements infinite impulse response to enhance the noise reduction process.

In some embodiments, an application-specific integrated circuit (ASIC) can be implemented to perform the mechanisms described herein. In certain embodiments, a hardware image-signal-processor (ISP) pipeline can be implemented for performing the mechanisms described herein. For example, the ISP pipeline includes a series of image processing modules which are synchronized with an ISP clock.

Figure 6:
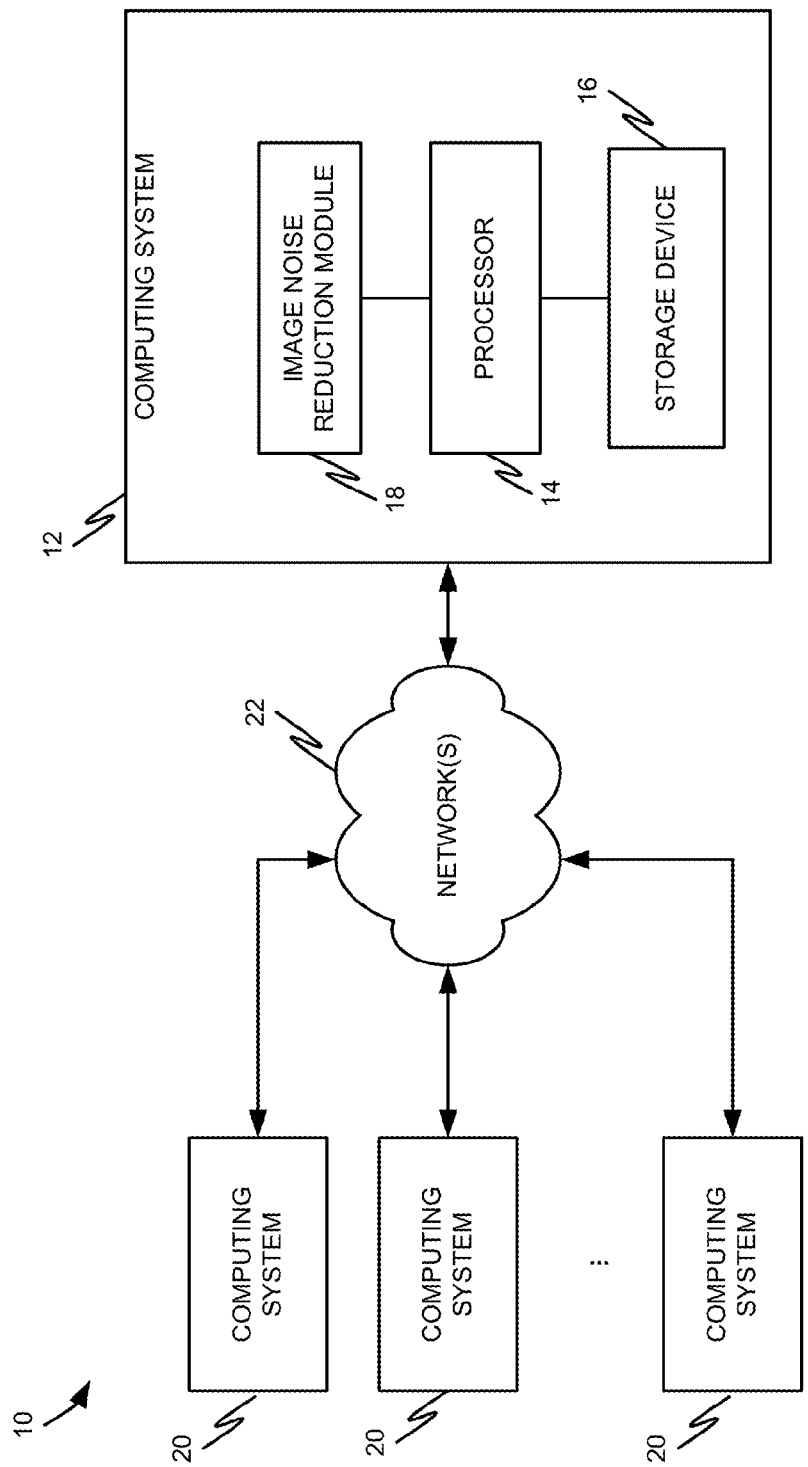
FIG. 6 depicts an example diagram showing a system for image noise reduction.

FIG. 6 depicts an example diagram showing a system for image noise reduction. As shown in FIG. 6, the system 10 includes a computing system 12 which contains a processor 14, a storage device 16 and an image noise reduction module 18. The computing system 12 includes any suitable type of computing device (e.g., a server, a desktop, a laptop, a tablet, a mobile phone, etc.) that includes the processor 14 or provide access to a processor via a network 22 or as part of a cloud based application. The image noise reduction module 18 performs tasks (e.g., the operations of the method shown in FIG. 2) and is implemented as part of a user interface module (not shown in FIG. 6). The image noise reduction module 18 can be implemented in software, firmware, hardware, or any combination thereof.

Figure 7:
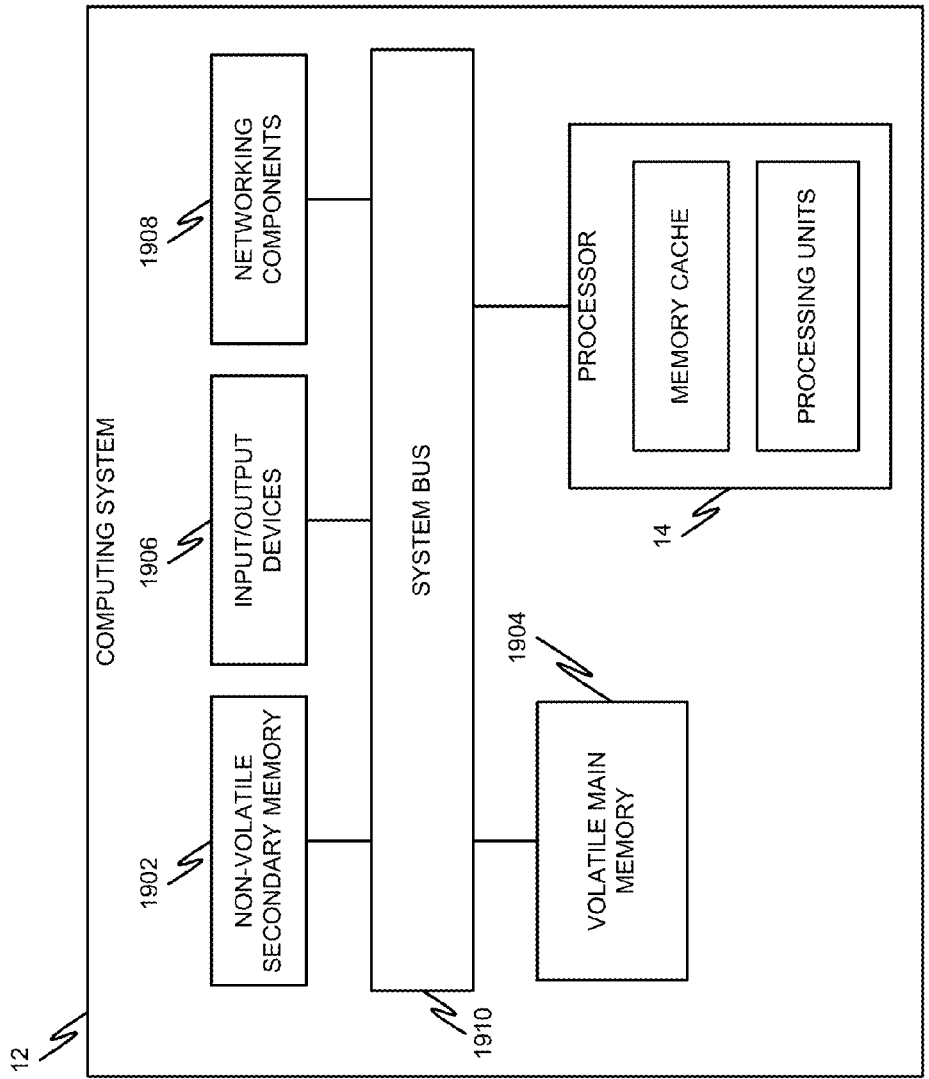
FIG. 7 depicts an example diagram showing a computing system for image noise reduction.

FIG. 7 depicts an example diagram showing a computing system for image noise reduction. As shown in FIG. 7, the computing system 12 includes a processor 14, memory devices 1902 and 1904, one or more input/output devices 1906, one or more networking components 1908, and a system bus 1910. In some embodiments, the computing system 12 includes the image noise reduction module 18, and provides access to the image noise reduction module 18 to a user as a stand-alone computer.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A method for performing image noise reduction, the method comprising:
    performing color estimation of a pixel in an image, wherein the image is stored in a data structure in a non-transitory computer-readable storage medium and the pixel has an initial pixel value;
    selecting a pixel-block size for determining one or more similarities between one or more first pixel blocks associated with the pixel, wherein each of the one or more first pixel blocks has a size corresponding to the pixel-block size, wherein determining one or more similarities is based at least in part on the color estimation;
    calculating one or more first pixel block average values for the one or more first pixel blocks;
    calculating a weighted average of the one or more first pixel block average values; and
    updating the data structure by replacing the initial pixel value of the pixel with the weighted average of the one or more first pixel block average values,
    wherein performing color estimation of the pixel includes,
        determining one or more second pixel blocks associated with the pixel,
        calculating one or more second pixel block average values for the second pixel blocks,
        calculating a weighted average of the second pixel block average values using a bilateral filtering algorithm, and
        estimating a color value of the pixel based at least in part on the weighted average of the second pixel block average values.

2. The method of claim 1, further comprising:
    searching a look-up table using the color estimation of the pixel;
    determining one or more thresholds that correspond to the color estimation of the pixel in the look-up table; and
    selecting the pixel-block size for determining the one or more similarities between the one or more first pixel blocks based at least in part on the one or more thresholds.

3. The method of claim 2, wherein selecting the pixel-block size for determining the one or more similarities between the one or more first pixel blocks includes:
    determining a plurality of initial pixel-block sizes;
    determining one or more similarity parameters based at least in part on the plurality of initial pixel-block sizes; and
    comparing the one or more similarity parameters associated with the plurality of initial pixel-block sizes with the one or more thresholds,
    wherein the pixel-block size is selected based at least in part on the comparison.

4. The method of claim 3, wherein the plurality of initial pixel-block sizes include 1×1, 3×3, 5×5, and 7×7.

5. The method of claim 3, wherein the plurality of initial pixel-block sizes include 2×2, 4×4, 6×6 and 8×8.

6. The method of claim 3, wherein determining one or more similarity parameters based at least in part on the plurality of initial pixel-block sizes includes:
    determining a plurality of initial pixel blocks associated with the pixel, wherein the plurality of initial pixel blocks are of an initial pixel-block size; and
    calculating the one or more similarity parameters based at least in part on the plurality of initial pixel blocks.

7. The method of claim 6, wherein:
    the one or more similarity parameters include a pixel block similarity parameter that is calculated as follows:

$$S_{block,k}(B_{k,x1,y1}, B_{k,x2,y2}) \equiv \sum_{i,j} S_{pixel}(p1_{i,j}, p2_{i,j}), \, p1 \in B_{k,x1,y1}, \, p2 \in B_{k,x2,y2}$$

wherein $S_{block,k}(B_{k,x1,y1}, B_{k,x2,y2})$ represents the pixel block similarity between a block $B_{k,x1,y1}$ that has a size of k×k and is centered at a pixel (x1, y1) and another block $B_{k,x2,y2}$ that has a size of k×k and is centered at a pixel (x2, y2); and
$S_{pixel}(p1_{i,j}, p2_{i,j})$ represents a pixel similarity between two pixels p1 and p2.

8. The method of claim 7, wherein the pixel similarity is calculated as follows:

$$S_{pixel}(p1, p2) \equiv \log\left(Pr\left\{\mu_1 - \mu_2 < JND\left(\frac{\mu_1 + \mu_2}{2}\right) \middle| p1, p2\right\}\right),$$
$$P1 \sim N(\mu_1, \sigma_1^2), \, P2 \sim N(\mu_2, \sigma_2^2)$$

wherein $S_{pixel}(p1, p2)$ represents the pixel similarity between the pixels p1 and p2, $\mu_1$ represents a pixel value of the pixel p1, $\mu_2$ represents a pixel value of the pixel p2, $\sigma_1$ represents a standard deviation associated with the pixel p1, and $\sigma_2$ represents a standard deviation associated with the pixel p2, Pr represents a probability, JND represents a just-noticeable-difference parameter, and N indicates a Gaussian probability distribution.

9. The method of claim 1, wherein determining the one or more first pixel blocks of the selected pixel-block size, the one or more first pixel blocks being associated with the pixel includes:
    determining a current pixel block that includes the pixel; and
    determining one or more reference pixel blocks near the current pixel block, the one or more first pixel blocks including the current pixel block and the one or more reference pixel blocks.

10. The method of claim 9, wherein calculating the weighted average of the first pixel block average values includes:
    determining one or more pixel block similarity parameters between the current pixel block and the one or more reference pixel blocks; and determining one or more weight parameters for the one or more first pixel blocks based at least in part on the pixel block similarity parameters,
wherein the weighted average of the first pixel block average values is determined based at least in part on the one or more weight parameters.

11. The method of claim 1, wherein the operations of the method are performed by one or more processors.

12. The method of claim 1, wherein the operations of the method are performed by an application specific integrated circuit.

13. A system for performing image noise reduction, the system comprising:
one or more non-transitory computer-readable storage media operable to store a data structure for an image; and
one or more processors operable to:
perform color estimation of a pixel in an image, the pixel having an initial pixel value;
select a pixel-block size for pixel block similarity calculations based at least in part on the color estimation;
determine one or more first pixel blocks of the selected pixel-block size, the one or more first pixel blocks being associated with the pixel;
calculate one or more first pixel block average values for the one or more first pixel blocks;
calculate a weighted average of the first pixel block average values; and
update the data structure by replacing the initial pixel value of the pixel with the weighted average of the first pixel block average values,
wherein performing color estimation of the pixel includes,
determining one or more second pixel blocks associated with the pixel,
calculating one or more second pixel block average values for the second pixel blocks,
calculating a weighted average of the second pixel block average values using a bilateral filtering algorithm, and
estimating a color value of the pixel based at least in part on the weighted average of the second pixel block average values.

14. The system of claim 13, wherein the one or more processors are operable to:
determine a plurality of initial pixel-block sizes;
perform similarity calculations based at least in part on the plurality of initial pixel-block sizes to determine one or more similarity parameters;
compare the one or more similarity parameters associated with the plurality of initial pixel-block sizes with one or more thresholds, the one or more thresholds being determined based at least in part on the color estimation; and
select the pixel-block size based at least in part on the comparison.

15. The system of claim 13, wherein the one or more processors are operable to:
determine a plurality of initial pixel blocks associated with the pixel, wherein the plurality of initial pixel blocks are of an initial pixel-block size; and
calculate the one or more similarity parameters based at least in part on the plurality of initial pixel blocks.

16. The system of claim 15, wherein the one or more processors are operable to calculate a pixel block similarity parameter of the one or more similarity parameters as follows:

$$S_{block,k}(B_{k,x1,y1}, B_{k,x2,y2}) \equiv \sum_{i,j} S_{pixel}(p1_{i,j}, p2_{i,j}), \ p1 \in B_{k,x1,y1}, p2 \in B_{k,x2,y2}$$

wherein $S_{block,k}(B_{k,x1,y1}, B_{k,x2,y2})$ represents the pixel block similarity parameter between a block $B_{k,\ x1,\ y1}$ that has a size of k×k and is centered at a pixel (x1, y1) and another block $B_{k,\ x2,\ y2}$ that has a size of k×k and is centered at a pixel (x2, y2), and $S_{pixel}(p1_{i,j}, p2_{i,j})$ represents a pixel similarity parameter between two pixels p1 and p2.

17. The system of claim 16, wherein the one or more processors are operable to calculate the pixel similarity parameter as follows:

$$S_{pixel}(p1, p2) \equiv \log\left(Pr\left\{\mu_1 - \mu_2 < JND\left(\frac{\mu_1 + \mu_2}{2}\right)\middle| p1, p2\right\}\right),$$
$$P1 \sim N(\mu_1, \sigma_1^2), P2 \sim N(\mu_2, \sigma_2^2)$$

wherein $S_{pixel}(p1, p2)$ represents the pixel similarity parameter between the pixels p1 and p2, $\mu_1$ represents a pixel value of the pixel p1, $\mu_2$ represents a pixel value of the pixel p2, $\sigma_1$ represents a standard deviation associated with the pixel p1, and $\sigma_2$ represents a standard deviation associated with the pixel p2, Pr represents a probability, JND represents a just-noticeable-difference parameter, and N indicates a Gaussian probability distribution.

18. The system of claim 13, where the one or more processors are operable to:
determine a current pixel block that includes the pixel;
determine one or more reference pixel blocks near the current pixel block, the one or more first pixel blocks including the current pixel block and the one or more reference pixel blocks;
determine one or more pixel block similarity parameters between the current pixel block and the one or more reference pixel blocks;
determine one or more weight parameters for the one or more first pixel blocks based at least in part on the pixel block similarity parameters; and
determine the weighted average of the first pixel block average values based at least in part on the one or more weight parameters.

19. A non-transitory machine-readable storage medium encoded with instructions for causing one or more processors to execute operations for performing image noise reduction, the operations comprising:
performing color estimation of a pixel in an image, wherein the image is stored in a data structure in the non-transitory computer-readable storage medium and the pixel has an initial pixel value;
selecting a pixel-block size for pixel block similarity calculations based at least in part on the color estimation;
determining one or more first pixel blocks of the selected pixel-block size, the one or more first pixel blocks being associated with the pixel;

calculating one or more first pixel block average values for the one or more first pixel blocks;

calculating a weighted average of the first pixel block average values; and updating the data structure by replacing the initial pixel value of the pixel with the weighted average of the first pixel block average values, wherein performing color estimation of the pixel includes, determining one or more second pixel blocks associated with the pixel, calculating one or more second pixel block average values for the second pixel blocks, calculating a weighted average of the second pixel block average values using a bilateral filtering algorithm, and estimating a color value of the pixel based at least in part on the weighted average of the second pixel block average values.

\* \* \* \* \*